May 17, 1938.   R. H. HART   2,117,319
PARACHUTE APPARATUS
Filed July 19, 1937
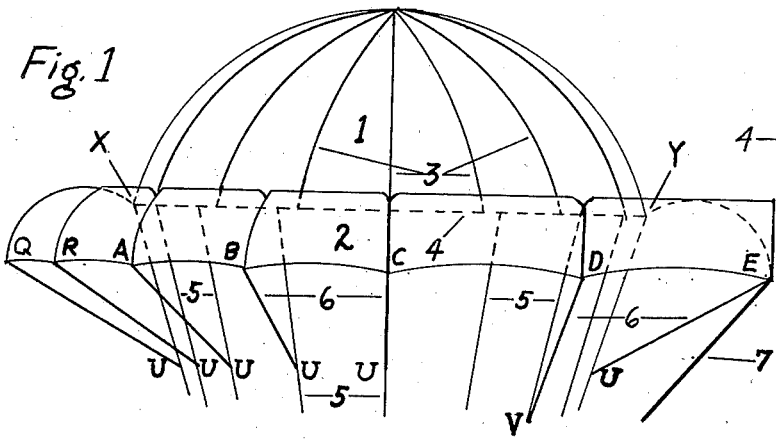
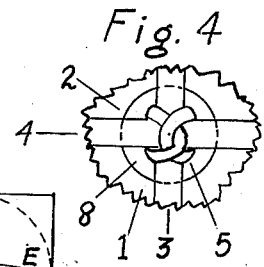
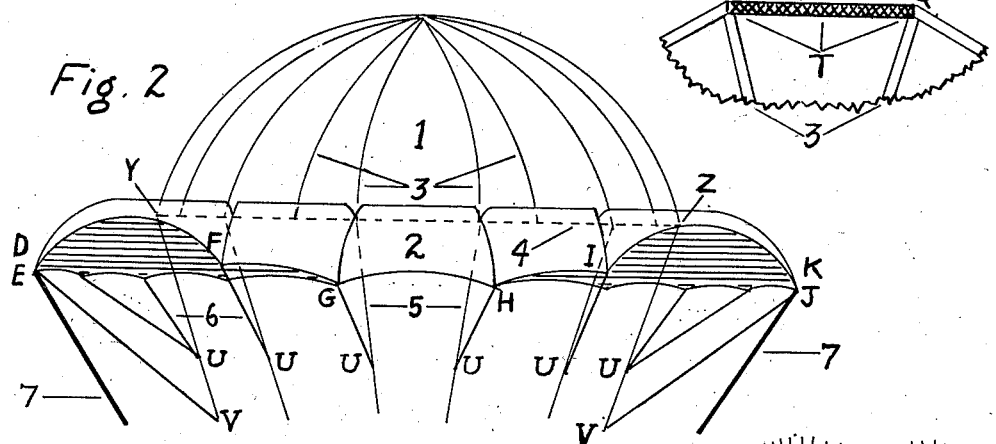
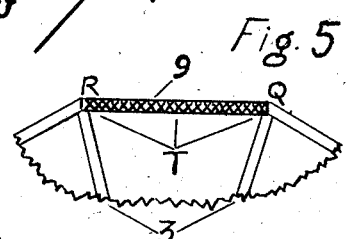
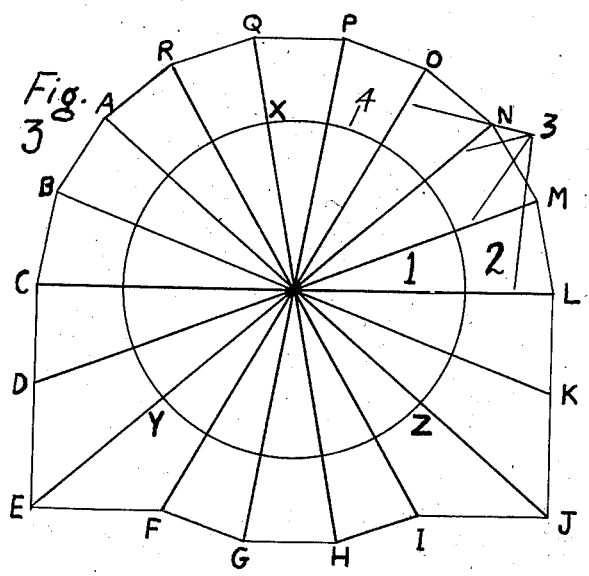
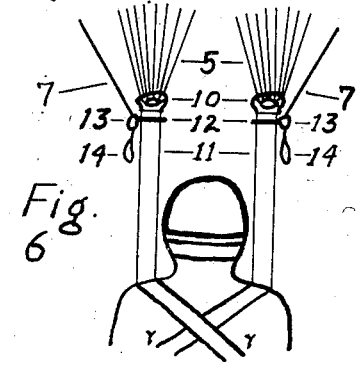
INVENTOR,
Richard H. Hart
BY
ATTORNEYS.

Patented May 17, 1938

2,117,319

UNITED STATES PATENT OFFICE 2,117,319

PARACHUTE APPARATUS

Richard H. Hart, New Orleans, La.

Application July 19, 1937, Serial No. 154,358

8 Claims. (Cl. 244—145)

My invention relates to improvements in parachutes and parachute steering devices, and it consists in the combinations, constructions, and arrangements hereinafter described and claimed.

Wearers of parachutes have in the past suffered grievous injury through their inability sufficiently to control the descent of their vehicles and to select suitable landing-places, to say nothing of those who may have lost their lives through delaying to quit their aircraft until they might be more certain of landing upon favorable terrain. It is therefore evident that a dirigible parachute is a necessity as well as a convenience.

It is a well known fact that the venting of a substantially horizontal column of air from the canopy of a parachute will have a propulsive effect thereon, but previous designers of these vehicles would appear to have overlooked the principle by which such a column of air may be employed to effectively control the direction of travel, this principle being that such a column of air must be so vented as to be tangent to a circle circumscribing the vertical axis of the parachute, in order to exert upon the parachute that prompt, positive, and effective revolutionary force necessary for efficient steering, it following as a matter of course that the greater the diameter of the circle to which said column of air is tangent the more effective the means of steering.

Since such a column of air may best be secured by allowing it to escape alongside an approximately straight side of the parachute, it follows that the most efficient form of parachute for this purpose is rectangular. However, this form is less efficient in respect to economy, packing, launching, et cetera, and a workable compromise may be obtained through the use of a canopy which approaches in shape a circle or regular polygon, the perimeter of which has been made to include one or more sides of sufficient length and straightness and so rigged that it or they will form the desired column or columns of air and will allow such column or columns of air to be vented tangent to a circle circumscribing the vertical axis of the parachute. By forming two such columns of air, venting one of them in a clockwise direction and the other in a counterclockwise direction, and by providing means whereby either such column, or both, may be vented or shut off at will, a parachute is developed which may be steered to right or to left, or may be allowed to propel itself directly forward, or may be allowed to descend without any self-propulsion, at the pleasure of the passenger. In other words, such a parachute has almost complete maneuverability.

The object of my invention, therefore, is to provide a parachute, the direction of descent of which shall have a horizontal component, such horizontal component being controllable at will by the parachutist.

A form of my invention is illustrated in the accompanying drawing forming part of this application, in which Figure 1 is an elevational view of the left side of the canopy in operation;

Figure 2 is an elevational view of the rear of of the canopy in operation;

Figure 3 is a plan view of the parachute canopy extended on a flat plane, this figure being approximately two-thirds the scale of Figures 1 and 2;

Figure 4 is an enlarged detail view showing one point of intersection of diametrical and circumscribing lengths of reinforcing material and the manner of attachment of one of the suspension lines thereto;

Figure 5 is an enlarged detail view of the edge of the canopy, showing manner of attachment of elastic shock absorbers;

Figure 6 is a somewhat enlarged view of the lower ends of suspension lines and steering lines, together with the means whereby said steering lines are manipulated by the parachutist.

Dotted lines in Figures 1 and 2 indicate concealed lines or surfaces; shaded area in Figure 2 indicates mouths of vents; checkered area in Figure 4 indicates elastic material. Points are indicated by letters, individual parts by numerals.

Referring more particularly to Figures 1, 2, and 3, it will be seen that the parachute's canopy is in shape almost a regular polygon, the departures from regularity consisting in two wing-like extensions, CEF and LJI, upon opposite sides of the canopy, so contrived as to have the long sides CE and LJ approximately perpendicular to a diameter of the polygon, and the short sides EF and JI approximately perpendicular to the long sides CE and LJ; these two extensions, together with the rigging appertaining thereto, form the vents which are the basal characteristic of this parachute.

Traversing the canopy diametrically, and dividing it into a number of approximately equiangular segments, are several lengths of tape or cord or other reinforcing material, attached to the canopy by any convenient means, designated herein by the letters QH, RI, AJ, et cetera, and also by the numeral 3, so placed as to intersect each point upon the perimeter of the canopy where said perimeter changes direction; this perimeter is further reinforced by a circumscribing length of reinforcing material EJQE upon its upper surface and attached thereto by any convenient means. At a convenient distance from the perimeter, and also upon the upper surface of the canopy, is attached by any convenient means a second circumscribing length of reinforcing material, XYZ, also designated by the numeral 4, intersecting the lengths of diametrical reinforcing material 3 at points equidistant from the center of the canopy, and dividing the whole canopy into two areas, the inner of which is designated by the numeral 1, and the outer by the numeral 2.

The circumscribing line XYZ is the line of primary suspension; that is, it is the line along which the primary suspension lines 5 are attached to the canopy. The perimetric line EJQE is the line of secondary suspension; that is, it is the line along which the secondary suspension lines 6 are attached to the canopy. These secondary suspension lines are in reality prolongations or extensions of the diametrical reinforcing lines 3, each such prolongation or extension being of convenient length and attached at its lower extremity to one or more of the primary suspension lines at a convenient point, U. The points E and J have a different class of secondary suspension lines attached thereto; these lines, designated by the numeral 7 and known as steering lines, extend downward from the points E and J to points where they may be manipulated by the parachutist, in a manner more particularly described hereinafter. The secondary suspension lines attached to the canopy at the points D and K, which lie upon the long, air-column-forming sides CE and LJ of the canopy, are of such length and attached to the primary suspension lines at suitable points V in such manner as will aid most effectively in the formation of the desired columns of air.

From the three paragraphs next preceding, it will be apparent that the canopy, together with the primary and secondary suspension lines, forms in effect two concentric parachutes, the outer of which is attached to, and aids in the support of, the inner. However, it is not to be understood that this is a form of construction necessary to this type of parachute, petitioner having demonstrated by actual test that parachutes having the same or similar outlines, but having suspension lines attached only at the perimeter, may be steered by the application of the same physical principles and method of manipulation.

In Figure 4, it will be seen that, at the point of intersection of the lengths of reinforcing material 3 and 4, the canopy is provided with an opening 8, of sufficient size for the passage therethrough of the suspension line 5, which by a four-way cross or other suitable means is attached to both lengths of reinforcing material in such manner as to join them together and at the same time employ both lengths in the suspension of the load.

In Figure 5, it will be seen that a length of elastic material 9 is attached at the points marked T to the perimeter of the canopy along the line RQ; this elastic material is normally of shorter length than is the side RQ, thus contracting said side and allowing it to respond elastically to the shock of opening, as well as restraining the central portion of said side from flaring outward and spilling a portion of the air which it is desired should be utilized in the formation of the propulsive columns of air hereinabove mentioned and described.

In Figure 6, the lower extremities of the suspension lines 5 are shown attached to the rings 10, which in turn are shown attached to the riser straps 11, supporting the parachutist. Encircling the riser straps are the sliding members 12, of such size and shape that they may move freely up and down upon said riser straps without being able to pass above the rings, 10. These sliding members are provided with eyes or other suitable means, 13, for attaching the steering lines 7, and the loops 14 adapted for manual grasping by the parachutist. The steering lines are of such length that, when the canopy is distended and the sliding members are at the uppermost limit of permitted travel upon the riser straps, the winglike extensions CEF and LJI of the canopy shall form substantially straight arched vents, while the drawing downward by the parachutist of the lines 7, either directly or by means of the loops 14, will result in pulling inward and downward the corners E and J, temporarily closing the vents.

From the above description, it will be seen that in its normal attitude when distended the canopy has both the right and left vents open, these vents operating to maintain a balanced propulsive effect upon the parachute, propelling it directly forward as it descends; that when the right steering line is drawn downward the right vent will be closed, and the column of air escaping horizontally from the open left vent, exerting a clockwise impulsion to the parachute, will cause it to turn to the right; that when the left steering line alone is drawn downward the process is reversed and the parachute caused to turn to the left; that when both lines are drawn downward all self-propulsive effect is eliminated and the parachute descends influenced only by gravitation and any air-currents which it may encounter. It will also be noted that the cushion of air sustaining the canopy during descent tends continually to maintain the vents open and operative, and that it is only necessary for the parachutist to release his grasp upon the steering lines or manipulating loops in order that the vents may regain their normal shape and function.

It will also be apparent that parachutes embodying the same principles but varying slightly in construction can be made to serve various purposes. For instance, a parachute having no normal self-propulsive effect but which can be rotated when desired may be obtained by securing the steering lines to the lower ends of the risers in such manner that one line may be disengaged therefrom and the vent to which it is connected allowed to function temporarily. Another type of parachute may be obtained by so constructing it that both vents operate in the same direction; i. e., both clockwise, or the reverse. This type would rotate with considerable velocity, and would be useful for exhibition-jumping, pyrotechnic displays, et cetera.

I claim:

1. A parachute having a canopy and suspension means, said canopy being of flexible material and of any convenient shape, and having above the plane of its lowest periphery venting means so contrived and arranged that there may be vented therefrom a more-or-less horizontal column of air, such column of air being not perpendicular to the vertical axis of the parachute but tangent instead to a circle circumscribed about the vertcial axis of the canopy, such venting means having closing means connected therewith capable of operation by the person suspended from the canopy, and such venting means being capable of imparting horizontal rotation to the parachute.

2. A parachute having a canopy and suspension means, said canopy being of flexible material and of any convenient shape, and having above the plane of its lowest periphery venting means so contrived and arranged that there may be vented therefrom two more-or-less horizontal columns of air, such columns of air being not perpendicular to the vertical axis of the parachute but each tangent instead to a circle circumscribed about the vertical axis of the canopy, one of such columns of air being vented in a direction clockwise with respect to such tangent circle, and the second column being vented in a direction counter-clockwise with respect to such tangent circle, such venting means having connected therewith means for closing said venting means, such closing means being so contrived and arranged as to be capable of operation by the person suspended from the canopy, and either of such venting means being capable of imparting horizontal rotation to the parachute.

3. A parachute having a canopy of flexible material, said canopy having permanently attached thereto at suitable points upon its inner surface elastic means capable of contracting the canopy when it is not inflated, to the end that the canopy may offer a certain amount of elastic resistance to inflation, and the shock usually incident to such inflation be thereby reduced.

4. A parachute having a canopy of flexible material, said canopy having permanently attached thereto at suitable points upon or near its outer edge elastic means capable of contracting that portion of its periphery to which such elastic means are attached, to the end that such outer portion of the periphery may undergo a limited expansion under shock, but under substantially normal operating conditions shall maintain a circumference approximating the circumference of a portion of the periphery less distant from the center of the canopy, thus tending to prevent the escape of air from the canopy across the edge of that portion of the canopy's periphery so constricted.

5. A parachute having a canopy of flexible material, means for reinforcing said canopy, and means for suspending a load from said canopy, said reinforcing means consisting of lengths of suitable material attached to the canopy by any convenient means, a number of such lengths of reinforcing material diametrically crossing said canopy at suitable intervals and another such length of reinforcing material circumscribing a portion of said canopy less distant from the canopy's center than its perimeter and intersecting said diametrically crossing lengths of reinforcing material at a plurality of points; said suspending means consisting primarily in a number of lengths of suitable material, each such length being connected at one end by suitable means to the load, from the point of which connection it ascends more or less directly to the canopy, through which it passes by means of a suitable opening at the point of intersection of one of said diametrically crossing lengths of reinforcing material with said circumscribing length of reinforcing material, said length of suspending material being attached to and holding together by convenient means said diametrically crossing and circumscribing lengths of reinforcing material; said suspending means consisting secondarily in prolongations of each end of the above described diametrically crossing lengths of reinforcing material, such prolongations being of suitable length and their extremities attached by suitable means to the primary suspending means above described at such points and in such manner as will maintain that portion of the canopy exterior to said circumscribing length of reinforcing material in the form of an arch capable of entrapping air and resisting descent.

6. A parachute having a canopy of flexible material, means for suspending a person from said canopy, and means for venting from beneath a portion of the perimeter of said canopy a more-or-less horizontal column of air in a direction tangent to a circle circumscribed about the vertical axis of the canopy, said venting means being closable by drawing downward such portion of the perimeter of said canopy, and means whereby such portion of the perimeter of said canopy may be drawn downward by the person suspended from the canopy.

7. A parachute having a canopy of flexible material, means for suspending a person from said canopy, and means for venting from beneath portions of the perimeter of said canopy two more-or-less horizontal columns of air, each such column of air being vented in a diirection tangent to a circle circumscribed about the vertical axis of said canopy, and means whereby either such portion of the perimeter of said canopy may be drawn downward by the person suspended from the canopy.

8. A parachute having a canopy of flexible material, means for suspending a person from said canopy, means for venting two more-or-less horizontal columns of air from said canopy, said venting means being closable by drawing downward portions of the perimeter of said canopy, and means whereby such portions of the perimeter of said canopy may be drawn downward by the person suspended from the canopy; said suspending means consisting in part of suspension lines attached at their upper ends by convenient means to the canopy and at their lower ends by means of metal rings to riser straps sustaining the person suspended; said means for drawing downward such portions of the perimeter of the canopy consisting in lengths of suitable material fastened at their upper ends to suitable points upon those portions of the perimeter of the canopy which it is desired to draw downward, and attached at their lower ends by means of suitable devices to said riser straps in such manner that such devices may travel up and down upon said straps without being able to pass above said metal rings, said attaching devices being supplied with suitable means for attaching thereto the lower ends of the lengths of material used for drawing downward the said portions of the perimeter of said canopy, and said attaching devices being also supplied with means adapted for manual grasping by the person suspended from the canopy.

RICHARD H. HART.